United States Patent
Shi

(10) Patent No.: US 10,353,403 B2
(45) Date of Patent: Jul. 16, 2019

(54) AUTONOMOUS FLYING DEVICE, CONTROL METHOD OF AUTONOMOUS FLYING DEVICE, AND NON-TRANSITORY RECORDING MEDIUM

(71) Applicant: Panasonic Intellectual Property Management Co., Ltd., Osaka (JP)

(72) Inventor: Hongjie Shi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 208 days.

(21) Appl. No.: 15/283,564

(22) Filed: Oct. 3, 2016

(65) Prior Publication Data
US 2017/0102715 A1    Apr. 13, 2017

(30) Foreign Application Priority Data
Oct. 7, 2015  (JP) ................. 2015-199473

(51) Int. Cl.
| G05D 1/10 | (2006.01) |
| H04N 5/232 | (2006.01) |
| G05D 1/00 | (2006.01) |
| G06K 9/00 | (2006.01) |
| B64C 39/02 | (2006.01) |
| B64D 47/08 | (2006.01) |

(52) U.S. Cl.
CPC ........... *G05D 1/101* (2013.01); *B64C 39/024* (2013.01); *B64D 47/08* (2013.01); *G05D 1/0094* (2013.01); *G06K 9/0063* (2013.01); *H04N 5/23296* (2013.01)

(58) Field of Classification Search
CPC .... G05D 1/101; G05D 1/0094; B64C 39/024; B64D 4/08; G06K 9/0063; H04N 5/23296
USPC .......................................... 701/14
See application file for complete search history.

(56) References Cited

U.S. PATENT DOCUMENTS

| 2014/0166817 A1* | 6/2014 | Levien .................. B64C 39/024 |
| | | 244/190 |
| 2014/0257595 A1* | 9/2014 | Tillmann ............... G01C 11/02 |
| | | 701/2 |

FOREIGN PATENT DOCUMENTS

| JP | 2004-101616 A | 4/2004 |
| JP | 2011-077617 A | 4/2011 |
| JP | 2014-119828 | 6/2014 |
| WO | 2015/014116 A1 | 2/2015 |

* cited by examiner

*Primary Examiner* — Redhwan K Mawari
*Assistant Examiner* — Rodney P King
(74) *Attorney, Agent, or Firm* — Greenblum & Bernstein, P.L.C.

(57) ABSTRACT

An autonomous flying device that tracks a moving object and flies includes a sensor that obtains first information related to a velocity of the moving object, a controller that controls flight of the autonomous flying device, and a driver that drives the autonomous flying device, the controller setting a velocity of the autonomous flying device in accordance with the first information so that the velocity of the autonomous flying device increases as a distance between the moving object and the autonomous flying device increases, the driver causing the autonomous flying device to fly at the velocity set by the controller.

19 Claims, 12 Drawing Sheets

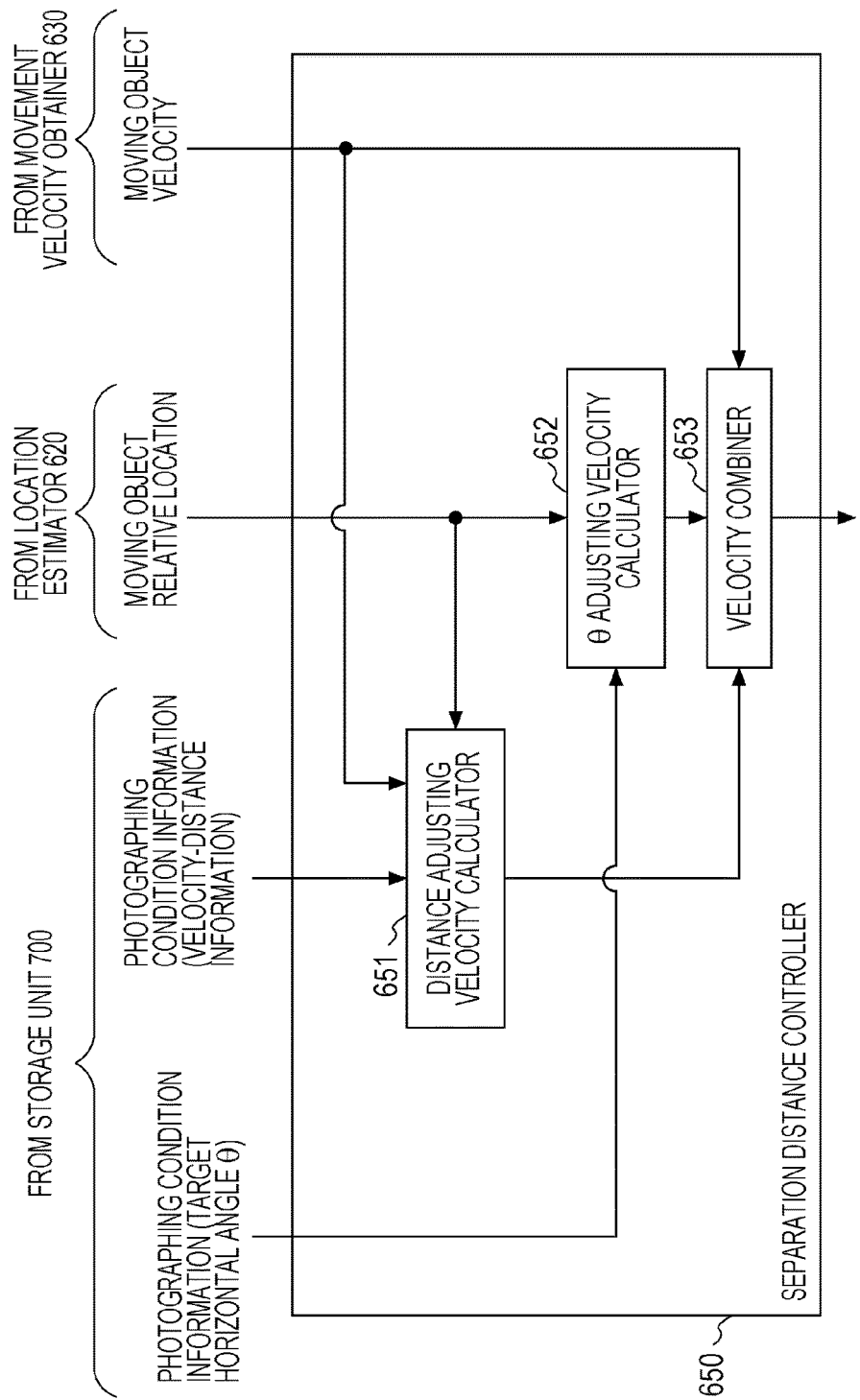

FIG. 4

```
START
  ↓
OBTAIN MOVING OBJECT VELOCITY — S101
  ↓
DETERMINE TARGET PHOTOGRAPHING DISTANCE — S102
  ↓
OBTAIN CURRENT SEPARATION DISTANCE — S103
  ↓
S104: CURRENT SEPARATION DISTANCE = TARGET PHOTOGRAPHING DISTANCE?
  — YES → END
  — NO ↓
CALCULATE DISTANCE ADJUSTING VELOCITY COMPONENT — S105
  ↓
END
```

FIG. 5

| MOVING OBJECT VELOCITY | TARGET PHOTOGRAPHING DISTANCE (PHOTOGRAPHING MAGNIFICATION 1×) | TARGET PHOTOGRAPHING DISTANCE (PHOTOGRAPHING MAGNIFICATION 2×) | ... | TARGET PHOTOGRAPHING DISTANCE (PHOTOGRAPHING MAGNIFICATION 10×) |
|---|---|---|---|---|
| 1 m/s | 1 m | 2 m | ... | 10 m |
| 2 m/s | 2 m | 4 m | ... | 20 m |
| ⋮ | ⋮ | ⋮ | ⋮ | ⋮ |
| 10 m/s | 10 m | 20 m | ... | 100 m |

FIG. 16

```
START
  ↓
OBTAIN MOVING OBJECT VELOCITY  — S501
  ↓
DETERMINE TARGET PHOTOGRAPHING MAGNIFICATION  — S502
  ↓
CONTROL PHOTOGRAPHING MAGNIFICATION  — S503
  ↓
END
```

FIG. 17

| MOVING OBJECT VELOCITY | PHOTOGRAPHING MAGNIFICATION (PHOTOGRAPHING DISTANCE 1 m) | PHOTOGRAPHING MAGNIFICATION (PHOTOGRAPHING DISTANCE 2 m) | ... | PHOTOGRAPHING MAGNIFICATION (PHOTOGRAPHING DISTANCE 10 m) |
|---|---|---|---|---|
| 1 m/s | 1× | 2× | ... | 10× |
| 2 m/s | 0.5× | 1× | ... | 5× |
| ⋮ | ⋮ | ⋮ | ⋮ | ⋮ |
| 10 m/s | 0.1× | 0.2× | ... | 1× |

னnited States Patent US 10,353,403 B2

AUTONOMOUS FLYING DEVICE, CONTROL METHOD OF AUTONOMOUS FLYING DEVICE, AND NON-TRANSITORY RECORDING MEDIUM

BACKGROUND

1. Technical Field

The present disclosure relates to an autonomous flying device, a control method of the autonomous flying device, and a non-transitory recording medium.

2. Description of the Related Art

A conventional autonomous flying device which has been proposed photographs a moving object while tracking the moving object, such as a human, and obtains an image of the moving object. Japanese Unexamined Patent Application Publication No. 2014-119828 discloses techniques related to such an autonomous flying device.

However, Japanese Unexamined Patent Application Publication No. 2014-119828 described above needs further improvement.

SUMMARY

In one general aspect, the techniques disclosed here feature an autonomous flying device that tracks a moving object and flies includes a sensor that obtains first information related to a velocity of the moving object, a controller that controls flight of the autonomous flying device, and a driver that drives the autonomous flying device, the controller setting a velocity of the autonomous flying device in accordance with the first information so that the velocity of the autonomous flying device causes a distance between the moving object and the autonomous flying device increasing as the velocity of the moving object increases, the driver causing the autonomous flying device to fly at the velocity set by the controller.

An autonomous flying device, a control method of the autonomous flying device, and a non-transitory recording medium according to the present disclosure can suitably inhibit occurrence of blurring or disappearance of the moving object on a taken image.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is a block diagram that illustrates an example of a structure of a separation distance controller according to the first embodiment;

FIG. 4 is a flow chart that illustrates an example of operation that a distance adjusting velocity calculator according to the first embodiment performs so as to calculate a distance adjusting velocity component;

FIG. 5 is a chart that illustrates an example of photographing condition information stored in a storage unit according to the first embodiment;

FIG. 16 is a flow chart that illustrates an example of operation that a camera controller according to the second embodiment performs so as to control photographing magnification of a photographing unit; and FIG. 17 is a chart that illustrates an example of photographing condition information stored in a storage unit according to the second embodiment.

DETAILED DESCRIPTION

Figure 1:
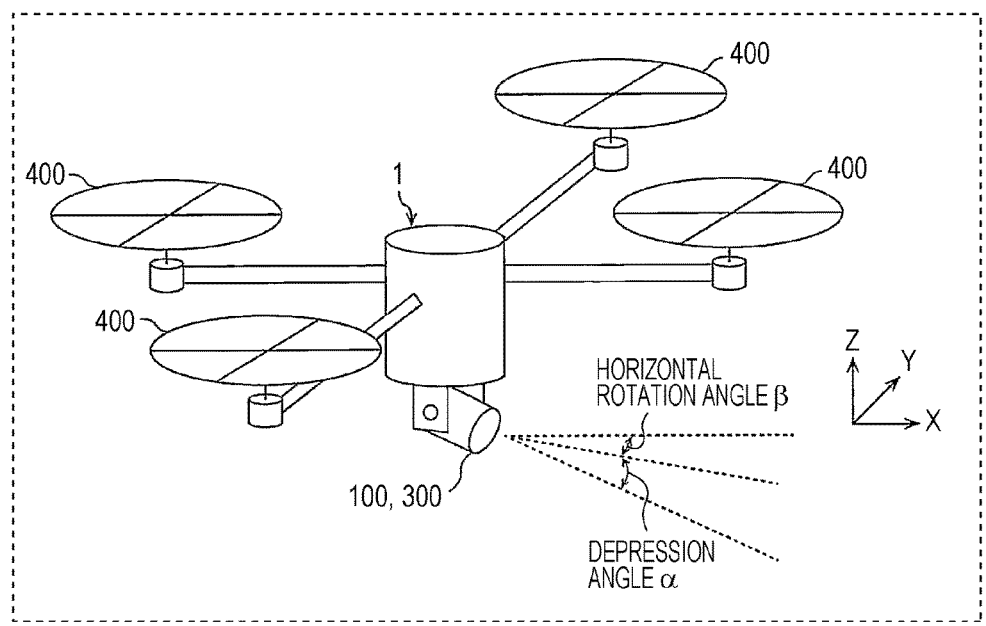
FIG. 1 is a perspective view of the external appearance of an autonomous flying device according to a first embodiment.

<<Underlying Knowledge Forming Basis of the Present Disclosure>>

The autonomous flying device disclosed in Japanese Unexamined Patent Application Publication No. 2014-119828 tracks a moving object and flies while keeping the separation distance from the moving object constant regardless of the movement velocity of the moving object. When the movement velocity of the moving object is high, however, blurring of the moving object on a taken image may occur or the moving object may disappear from the taken image.

Thus, the present inventor has reviewed measures for improvement described below.

(1) An autonomous flying device according to an aspect of the present disclosure is an autonomous flying device that tracks a moving object and flies, the autonomous flying device including a sensor that obtains first information related to a velocity of the moving object; a controller that controls flight of the autonomous flying device; and a driver that drives the autonomous flying device, the controller setting a velocity of the autonomous flying device in accordance with the first information so that the velocity of the autonomous flying device causes a distance between the moving object and the autonomous flying device increasing as the velocity of the moving object increases, the driver causing the autonomous flying device to fly at the velocity set by the controller.

Thus, as the movement velocity of the moving object increases, the separation distance between the autonomous flying device and the moving object increases and the angle of view becomes wider and accordingly, occurrence of blurring or disappearance of the moving object on an image where the moving object is photographed can be inhibited. As the movement velocity of the moving object decreases, the separation distance between the autonomous flying device and the moving object decreases. Accordingly, when for example, the autonomous flying device takes an image, the angle of view becomes narrower and as a result, it can be inhibited that the moving object appears small on the taken image and occurrence of blurring or disappearance of the moving object on the taken image can be suitably inhibited.

(2) In the autonomous flying device according to the above-described aspect, the distance may be a straight-line distance between the moving object and the autonomous flying device.

Thus, in both cases where the movement velocity of the moving object is high and low, the depression angle between the horizontal plane for the autonomous flying device and the moving object can be maintained so as to be constant. Accordingly, the separation distance can be changed while maintaining the viewpoint of the autonomous flying device with respect to the moving object.

(3) In the autonomous flying device according to the above-described aspect, the distance may be a horizontal distance between the moving object and the autonomous flying device.

Thus, in both cases where the movement velocity of the moving object is high and low, the altitude of the autonomous flying device can be maintained so as to be constant.

(4) In the autonomous flying device according to the above-described aspect, when the velocity of the moving object is higher than a predetermined threshold value, the controller may set a first velocity that causes the distance to be a first distance, and the driver may cause the autonomous flying device to fly at the first velocity, and when the velocity of the moving object is lower than the predetermined threshold value, the controller may set a second velocity that causes the distance to be a second distance that is shorter than the first distance, and the driver may cause the autonomous flying device to fly at the second velocity.

Thus, a photographing mode in which an image with a wide angle of view is taken and a photographing mode in which an image with a narrow angle of view is taken, can be switched, depending on the movement velocity of the moving object, by for example, setting one threshold value. For example, when the movement velocity of the moving object is high, the mode in which the angle of view is wide is employed, and when the movement velocity of the moving object is low, the mode in which the angle of view is narrow is employed. Further, switch among a plurality of modes based on the movement velocity of the moving object is enabled by for example, setting a plurality of threshold values.

(5) In the autonomous flying device according to the above-described aspect, when the first information indicates that the velocity of the moving object changes from a first velocity to a second velocity that is higher than the first velocity, the controller may set the velocity of the autonomous flying device to a third velocity that increases the distance, and the driver may cause the autonomous flying device to fly at the third velocity.

Thus, when the movement velocity of the moving object increases during the control of the separation distance between the autonomous flying device and the moving object or after the completion of the control of the separation distance between the autonomous flying device and the moving object, the separation distance can be increased.

(6) In the autonomous flying device according to the above-described aspect, when the first information indicates that the velocity of the moving object changes from first velocity to second velocity that is lower than the first velocity, the controller may set the velocity of the autonomous flying device to a fourth velocity so as to decrease the distance, and the driver may cause the autonomous flying device to fly at the fourth velocity.

Thus, when the movement velocity of the moving object decreases during the control of the separation distance between the autonomous flying device and the moving object or after the completion of the control of the separation distance between the autonomous flying device and the moving object, the separation distance can be decreased.

(7) The autonomous flying device according to the above-described aspect may further include a memory that stores second information indicating a corresponding relation between the velocity of the moving object and a target distance between the moving object and the autonomous flying device, wherein when the first information indicates that the velocity of the moving object is a first velocity, the controller may set a second velocity in accordance with the second information, wherein the second velocity causes the distance to be a first target distance corresponding to the first velocity, and the driver causes the autonomous flying device to fly at the second velocity.

Thus, because of the predetermined photographing condition information, the separation distance can be controlled so as to be the distance that can inhibit occurrence of blurring or disappearance of the moving object on a taken image.

(8) In the autonomous flying device according to the above-described aspect, when the distance is longer than the first target distance corresponding to the first velocity, the controller may set the second velocity that is higher than the first velocity, and the driver may cause the autonomous flying device to fly at the second velocity, and when the distance is shorter than the first distance corresponding to the first velocity, the controller may set a third velocity that is lower than the first velocity, and the driver causes the autonomous flying device to fly at the third velocity.

Thus, the separation distance can be controlled so as to be the distance that can inhibit occurrence of blurring or disappearance of the moving object on a taken image by controlling the flight velocity of the autonomous flying device.

(9) The autonomous flying device according to the above-described aspect may further include a camera that captures an image including the moving object, where the image may be a still image or a moving image.

(10) An autonomous flying device according to another aspect of the present disclosure tracks a moving object and flies, and the autonomous flying device including a camera that captures an image including the moving object; a sensor that obtains first information related to a velocity of the moving object; a controller that controls flight of the autonomous flying device; and a driver that drives the autonomous flying device, the controller setting a photographing magnification of the camera in accordance with the first information, such that the photographing magnification decreases as the velocity of the moving object increases, the camera capturing the image at the photographing magnification set by the controller.

Thus, as the movement velocity of the moving object increases, the photographing magnification of an image where the moving object is photographed decreases and as the angle of view becomes wider, occurrence of blurring or disappearance of the moving object on the image where the moving object is photographed can be inhibited. As the movement velocity of the moving object decreases, the photographing magnification of an image where the moving object is photographed increases and the angle of view becomes narrower, and as a result, it can be inhibited that the moving object becomes small on the taken image. Accordingly, occurrence of blurring or disappearance of the moving object on a taken image can be suitably inhibited.

(11) In the autonomous flying device according to the above-described aspect, when the velocity of the moving object is higher than a predetermined threshold value, the controller may set the photographing magnification to a first magnification, and the camera may capture the image at the first magnification, and when the velocity of the moving object is lower than the predetermined threshold value, the controller may set the photographing magnification to a second magnification that is higher than the first magnification, and the camera captures the image at the second magnification.

Thus, the mode in which the angle of view is wide and the mode in which the angle of view is narrow can be switched, depending on the movement velocity of the moving object, by for example, setting one threshold value. For example, when the movement velocity of the moving object is high, the mode in which the angle of view is wide is employed and when the movement velocity of the moving object is low, the mode in which the angle of view is narrow is employed. A plurality of modes can be switched, depending on the movement velocity of the moving object, by for example, setting a plurality of threshold values.

(12) In the autonomous flying device according to the above-described aspect, when the first information indicates that the velocity of the moving object changes from a first velocity to a second velocity that is higher than the first velocity, the controller may change the photographing magnification from a first magnification to second magnification that is lower than the first magnification, and the camera may switch from the first magnification to the second magnification and captures the image at the second magnification.

Thus, when the movement velocity of the moving object increases after the completion of the control of the photographing magnification, the photographing magnification can be decreased.

(13) In the autonomous flying device according to the above-described aspect, when the first information indicates that the velocity of the moving object changes from a first velocity to a second velocity that is lower than the first velocity, the controller may change the photographing magnification from a first magnification to a second magnification that is higher than the first magnification, and the camera may switch from the first magnification to the second magnification and capture the image at the second magnification.

Thus, when the movement velocity of the moving object decreases after the completion of the control of the photographing magnification, the photographing magnification can be increased.

(14) The autonomous flying device according to the above-described aspect may further include a memory that stores second information indicating a corresponding relation between the velocity of the moving object and target photographing magnification, wherein the controller may set the photographing magnification to a first magnification corresponding to the velocity of the moving object in accordance with the second information, and the camera may capture the image at the first magnification.

Thus, the predetermined photographing condition information enables the photographing magnification to be controlled so as to be the photographing magnification that can inhibit occurrence of blurring or disappearance of the moving object on a taken image.

(15) In the autonomous flying device according to the above-described aspect, the image captured by the camera may be a still image or a moving image.

Embodiments of the present disclosure are described below with reference to the drawings.

First Embodiment

A first embodiment is described using FIGS. 1 to 14B.
<Structure of Autonomous Flying Device>
A structure of an autonomous flying device 1 is described first.

FIG. 1 is a perspective view of the external appearance of an autonomous flying device 1 according to the first embodiment.

The autonomous flying device 1 is a device that tracks a moving object, such as a human, and autonomously flies. For example, the autonomous flying device 1 tracks and photographs a human who is skydiving, climbing, skiing, snowboarding, or cycling. Thus, an impactful image can be taken. The moving object is not limited to a human but may be an animal, an automobile, a two-wheel vehicle, or the like.

The autonomous flying device 1 includes a camera-cum-distance-sensor (a distance detecting sensor 100 and a photographing unit 300, which are described below) and rotors (a propeller) 400. As illustrated in FIG. 1, the autonomous flying device 1 flies because of for example, the motor 500 causing the four rotors 400 to rotate.

The camera-cum-distance-sensor can rotate by for example, a horizontal rotation angle $\beta$ on a horizontal plane (an XY plane), which is indicated in FIG. 1. Further, the camera-cum-distance-sensor can rotate by for example, a depression angle $\alpha$ from the horizontal plane (the XY plane), which is indicated in FIG. 1. That is, the autonomous flying device 1 can perform photographing around the autonomous flying device 1 and detect the distance from an object present around the autonomous flying device 1.

Figure 2:
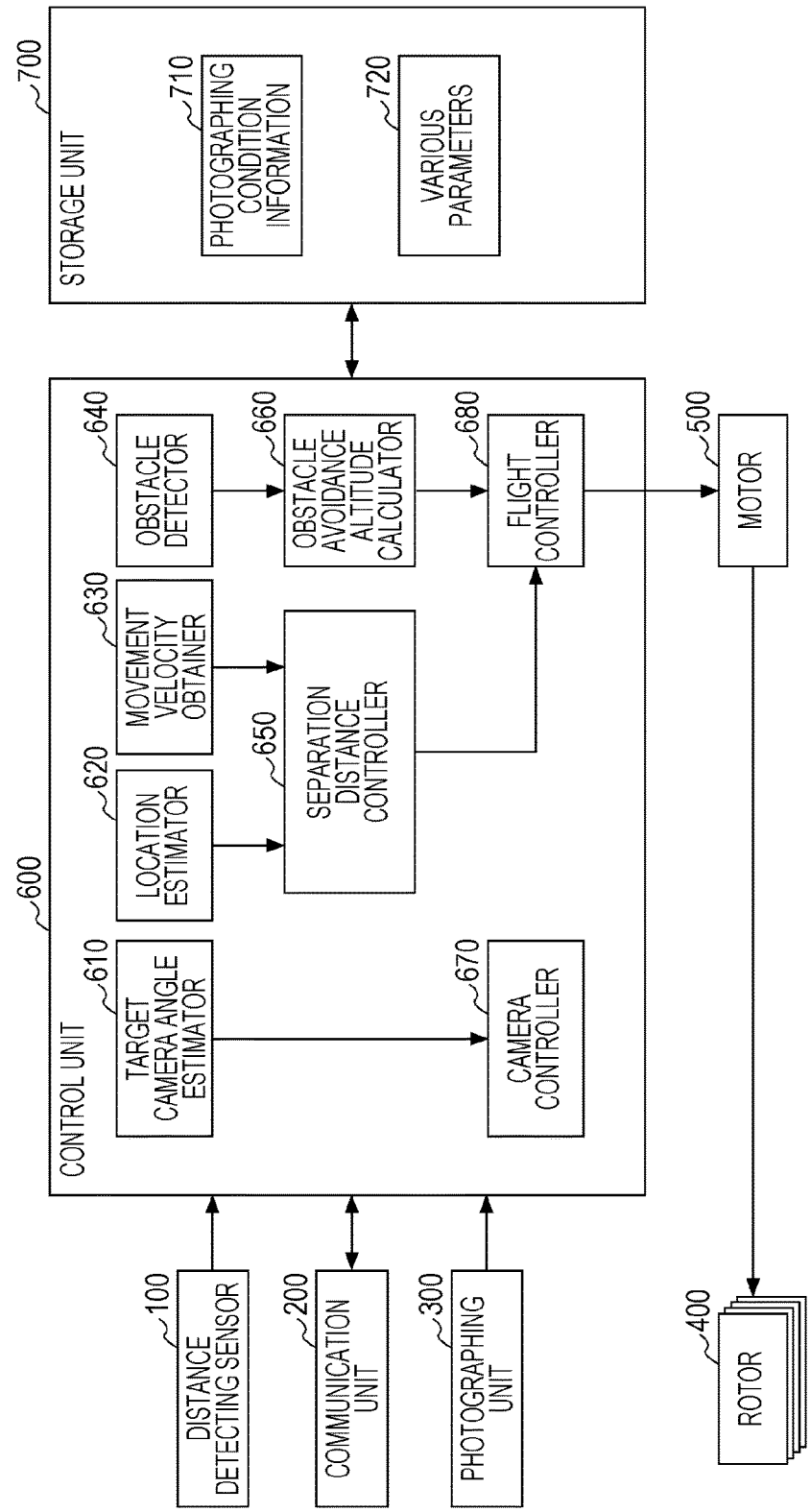
FIG. 2 is a block diagram that illustrates an example of a structure of the autonomous flying device according to the first embodiment.

FIG. 2 is a block diagram that illustrates an example of a structure of the autonomous flying device 1 according to the first embodiment.

The autonomous flying device 1 includes the distance detecting sensor 100, a communication unit 200, a photographing unit 300, the rotors 400, the motor 500, a control unit 600, and a storage unit 700.

The distance detecting sensor 100 detects the distance between an object present around the autonomous flying device 1, such as a moving object or an obstacle, and the autonomous flying device 1 and the location of the object relative to the autonomous flying device 1. For example, the distance detecting sensor 100 ultrasonically detects the distance and the relative location of the object present around the autonomous flying device 1. The method of detecting the distance and the relative location of the object present around the autonomous flying device 1 is not limited thereto but the detection may use light for example. Further, the distance detecting sensor 100 estimates the flight altitude of the autonomous flying device 1 by detecting the distance from the ground.

The communication unit 200 is a wireless module for radio communication with an external device, which is not illustrated, via a wireless local area network (LAN) or Bluetooth (trademark) for example. The communication unit 200 communicates with for example, a remote control or a smartphone that the moving object possesses.

For example, the photographing unit 300 (a photographing device) is a color camera that takes an image including a moving object. The image taken by the photographing unit 300 is a still image or a moving image. The photographing unit 300 is constituted of for example, an optical system, such as a variable-focal length lens, and a two-dimensional image sensor including two-dimensional array elements, such as a charge-coupled device (CCD) or a complementary metal oxide semiconductor (CMOS) of predetermined pixels, such as 1920×1080 pixels. The photographing unit 300 obtains taken images at predetermined time intervals. The taken images obtained by the photographing unit 300 are for example, stored in the storage unit 700, which is described below, or transmitted to an external device via the communication unit 200.

In the present embodiment, the photographing unit 300 is arranged so as to photograph space around the autonomous flying device 1, which is diagonally below the horizontal plane (the XY plane), as illustrated in FIG. 1. The photographing unit 300 is provided with for example, motors that adjust the depression angle α and the horizontal rotation angle β, respectively.

The rotors 400 constitute the propeller that enables the autonomous flying device 1 to fly and as described above, the autonomous flying device 1 includes the four rotors 400. As the number of revolutions of each of the four rotors 400 is controlled by the motor 500, the movement velocity, the traveling direction, the altitude, and the like of the autonomous flying device 1 are controlled.

The motor 500 is a motor for rotating the rotors 400. The motor 500 changes the number of revolutions of each of the four rotors 400 in accordance with an instruction from a flight controller 680, which is described below.

The control unit 600, which is a computer including a central processing unit (CPU) for example, estimates the location of the moving object, obtains the movement velocity, detects an obstacle, controls the photographing unit 300, and performs flight control of the autonomous flying device 1. The control unit 600 includes a target camera angle estimator 610, a location estimator 620, a movement velocity obtainer 630, an obstacle detector 640, a separation distance controller 650, an obstacle avoidance altitude calculator 660, a camera controller 670, and the flight controller 680.

The target camera angle estimator 610 detects the location of the moving object on a photographing screen of the photographing unit 300 using for example, image recognition techniques and determines whether or not the moving object is present centrally on the photographing screen. The target camera angle estimator 610 is described in detail with reference to FIG. 13, which is described below.

The location estimator 620 estimates the location of the moving object relative to the autonomous flying device 1 in accordance with the output of the distance detecting sensor 100 and the photographing unit 300. The location estimator 620 can recognize the moving object by for example, causing the photographing unit 300 to recognize a predetermined mark given to the moving object. Further, the location estimator 620 estimates the relative location of the moving object by causing the distance detecting sensor 100 to detect the relative location of the recognized moving object.

The movement velocity obtainer 630 obtains information that indicates the movement velocity of the moving object. The movement velocity obtainer 630 obtains the absolute velocity of the moving object in accordance with for example, output of a velocity sensor attached to the moving object, which is not illustrated. The movement velocity obtainer 630 obtains the information indicating the movement velocity of the moving object via the communication unit 200.

The obstacle detector 640 detects the location of an obstacle relative to the autonomous flying device 1 in accordance with the output of the distance detecting sensor 100. Specifically, the obstacle detector 640 detects the direction of the obstacle with respect to the front direction (the traveling direction) of the autonomous flying device 1, the elevation and depression angles of the obstacle from the horizontal plane (the XY plane), and the distance from the autonomous flying device 1 to the obstacle.

The separation distance controller 650 controls the separation distance between the autonomous flying device 1 and the moving object in accordance with the information indicating the movement velocity of the moving object obtained by the movement velocity obtainer 630. Further, the separation distance controller 650 controls the locational relation between the autonomous flying device 1 and the moving object. The separation distance controller 650 calculates a target flight velocity of the autonomous flying device 1 so as to control the separation distance and the locational relation between the autonomous flying device 1 and the moving object. The separation distance controller 650 is described in detail with reference to FIG. 3, which is described below.

The obstacle avoidance altitude calculator 660 calculates a target flight altitude using the location of the obstacle relative to the autonomous flying device 1 detected by the obstacle detector 640. The obstacle avoidance altitude calculator 660 is described in detail with reference to FIG. 10, which is described below.

The camera controller 670 controls the photographing direction of the photographing unit 300. The camera controller 670 is described in detail with reference to FIG. 13, which is described below.

The flight controller 680 causes the motor 500 to control the number of revolutions of each rotor 400 so that the velocity and the altitude of the autonomous flying device 1 become the flight velocity calculated by the separation distance controller 650 and the flight altitude calculated by the obstacle avoidance altitude calculator 660. Thus, the autonomous flying device 1 tracks the moving object and flies at the target flight velocity and the target flight altitude.

The storage unit 700 stores photographing condition information 710, various parameters 720, output of the distance detecting sensor 100, output of the velocity sensor, a taken image, and the like. The stored information is input and output between the storage unit 700 and the control unit 600. The storage unit 700 is for example, an information storing device, such as read-only memory (ROM), random access memory (RAM), or a hard disk drive (HDD).

The photographing condition information 710 is information related to the view of the photographing unit 300 and in the present embodiment, includes information that indicates predetermined corresponding relation between the movement velocity of the moving object and the target photographing distance, which is a desired separation distance. The information indicating the predetermined corresponding relation between the movement velocity of the moving object and the target photographing distance is described in detail with reference to FIG. 5, which is described below. Further, the photographing condition information 710 includes information related to a target horizontal angle θ, which indicates the locational relation between the autonomous flying device 1 and the moving object. The target horizontal angle θ is a photographing angle of the autonomous flying device 1 with respect to the direction opposite to the traveling direction of the moving object. When for example, the target horizontal angle θ is 0 degrees, the autonomous flying device 1 is located directly behind the moving object and tracks the moving object. When the target horizontal angle θ is 45 degrees, the autonomous flying device 1 is located diagonally behind the moving object and tracks the moving object. When for example, the target horizontal angle θ is 90 degrees, the autonomous flying device 1 is located next to the moving object while traveling in parallel to the moving object and tracks the moving object.

The various parameters 720 are for example, information related to proportional integral derivative (PID) control, which is a kind of feedback control. The information related to the PID control is for example, information where distance deviation between the current separation distance and the target photographing distance and the velocity are caused to correspond to each other.

<Structure and Operation of Separation Distance Controller>

A structure and operation of the separation distance controller 650 are described next using FIGS. 3 to 9.

FIG. 3 is a block diagram that illustrates an example of the structure of the separation distance controller 650 according to the first embodiment.

The separation distance controller 650 calculates the flight velocity of the autonomous flying device 1 so as to control the separation distance and the locational relation between the autonomous flying device 1 and the moving object. The separation distance controller 650 includes a distance adjusting velocity calculator 651, a θ adjusting velocity calculator 652, and a velocity combiner 653.

The distance adjusting velocity calculator 651 calculates a velocity component (a distance adjusting velocity component) for adjusting the separation distance between the autonomous flying device 1 and the moving object, which is included in velocity components included in the flight velocity. Operation that the distance adjusting velocity calculator 651 performs so as to calculate the distance adjusting velocity component is described using FIG. 4.

FIG. 4 is a flow chart that illustrates an example of the operation that the distance adjusting velocity calculator 651 according to the first embodiment performs so as to calculate the distance adjusting velocity component.

The movement velocity obtainer 630 obtains information that indicates the movement velocity of the moving object (step S101).

After that, the distance adjusting velocity calculator 651 determines a target photographing distance (step S102). Specifically, the distance adjusting velocity calculator 651 determines the target photographing distance by checking the information obtained by the movement velocity obtainer 630 and indicating the movement velocity against the photographing condition information 710 (the corresponding relation between the velocity of the moving object and the target photographing distance) stored in the storage unit 700. An example of the photographing condition information 710 is described using FIG. 5.

FIG. 5 is a chart that illustrates an example of the photographing condition information 710 stored in the storage unit 700 according to the first embodiment.

As illustrated in FIG. 5, the photographing condition information 710 is for example, information that indicates the corresponding relation between the movement velocity of the moving object and the target photographing distance. FIG. 5 indicates the corresponding relation between the movement velocity of the moving object and the target photographing distance in a case where each photographing magnification of the photographing unit 300 is fixed to a predetermined magnification. The photographing magnification of the photographing unit 300 is set by for example, a user and information that indicates the set photographing magnification is stored in the storage unit 700. As illustrated in FIG. 5, regardless of the degree of the photographing magnification, the target photographing distance increases as the velocity of the moving object increases.

When for example, the velocity of the moving object is 2 m/s while the photographing magnification of the photographing unit 300 is set to two times, which may also be rewritten as 2×, the distance adjusting velocity calculator 651 determines the target photographing distance as 4 m. For another example, when the velocity of the moving object is 10 m/s while the photographing magnification of the photographing unit 300 is set to 2×, the distance adjusting velocity calculator 651 determines the target photographing distance as 20 m. Thus, the distance adjusting velocity calculator 651 (the separation distance controller 650) performs control for increasing the separation distance as the movement velocity of the moving object increases.

After that, the distance adjusting velocity calculator 651 obtains a distance between the autonomous flying device 1 and the moving object estimated by the location estimator 620, which is also referred to as a moving object distance (step S103).

After that, the distance adjusting velocity calculator 651 determines whether or not the target photographing distance determined in step S102 and the moving object distance obtained in step S103 are equal to each other (step S104).

When the distance adjusting velocity calculator 651 determines that the target photographing distance and the moving object distance are equal to each other (YES in step S104), the operation that the distance adjusting velocity calculator 651 performs so as to calculate the distance adjusting velocity component ends.

When the distance adjusting velocity calculator 651 determines that the target photographing distance and the moving object distance are unequal (NO in step S104), the distance adjusting velocity calculator 651 calculates the distance adjusting velocity component (step S105). The method by which the distance adjusting velocity calculator 651 calculates the distance adjusting velocity component is described in detail with reference to FIG. 6, which is described below.

In this manner, the distance adjusting velocity calculator 651 (the separation distance controller 650) performs control for causing the separation distance to be the target photographing distance by checking the information indicating the movement velocity of the moving object and obtained by the movement velocity obtainer 630 against the photographing condition information 710 stored in the storage unit 700. Specifically, when the separation distance is longer than the target photographing distance, the distance adjusting velocity calculator 651 (the separation distance controller 650) performs control for increasing the flight velocity of the autonomous flying device 1 and when the separation distance is shorter than the target photographing distance, the distance adjusting velocity calculator 651 performs control for decreasing the flight velocity of the autonomous flying device 1.

For example, the process indicated in FIG. 4 is performed every desirable timing set by a user.

The θ adjusting velocity calculator 652 calculates a velocity component for adjustment (a θ adjusting velocity component) for positioning the autonomous flying device 1 at a location that forms the target horizontal angle θ with respect to the rear of the moving object (the direction opposite the traveling direction), which is included in the velocity components included in the flight velocity. The θ adjusting velocity calculator 652 is described in detail with reference to FIGS. 7 to 9, which are described below.

The velocity combiner 653 calculates the flight velocity of the autonomous flying device 1. The flight velocity includes a movement velocity component of the moving object, the distance adjusting velocity component, and the θ adjusting velocity component. Thus, the velocity combiner 653 calculates the flight velocity by combining the movement velocity component of the moving object, the distance adjusting velocity component, and the θ adjusting velocity component. The flight velocity in a case where the autonomous flying device 1 tracks the moving object from directly behind the moving object, that is, where the target horizontal angle θ is 0 degrees, is described using FIG. 6.

Figure 6:
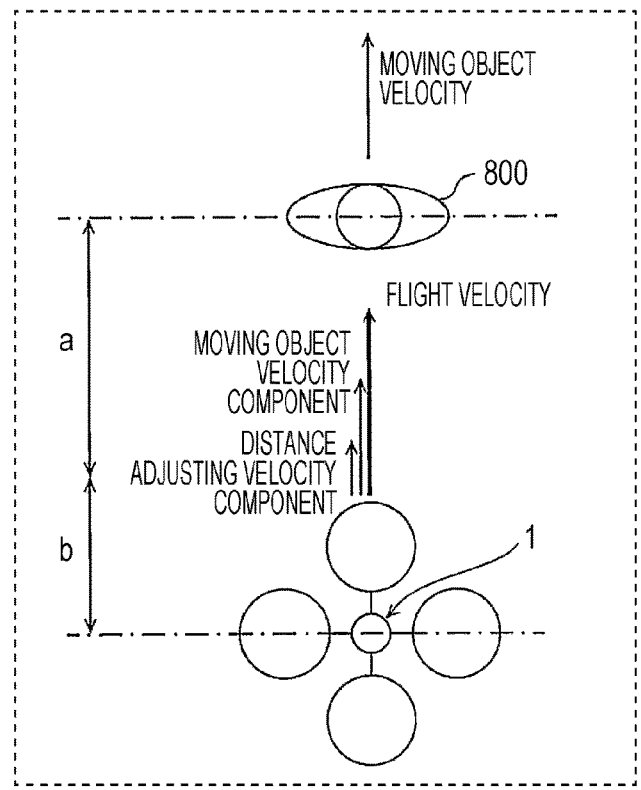
FIG. 6 is a diagram for describing flight velocity of the autonomous flying device according to the first embodiment.

FIG. 6 is a diagram for describing the flight velocity of the autonomous flying device 1 according to the first embodiment.

A distance a illustrated in FIG. 6 is the target photographing distance determined by the distance adjusting velocity calculator 651. The separation distance (the moving object distance) between the autonomous flying device 1 and the moving object 800 in the current state is the distance a plus a distance b. The distance b is a distance by which the autonomous flying device 1 needs to be close to the moving object 800 so as to cause the moving object distance in the current state to be the target photographing distance a. The distance adjusting velocity component is a component included in the flight velocity calculated by the velocity combiner 653 and is a velocity component for causing the distance b to be zero, that is, for causing the moving object distance in the current state to be the target photographing distance a. The distance adjusting velocity component is a velocity component in the direction from the autonomous flying device 1 toward the moving object 800. For example, the process indicated in FIG. 4 is performed at predetermined times and the distance adjusting velocity calculator 651 calculates the distance deviation between the moving object distance and the target photographing distance at the predetermined times. After that, in accordance with the distance deviation, the distance adjusting velocity calculator 651 calculates the distance adjusting velocity component by control techniques, such as the PID control. In the present embodiment, the distance adjusting velocity component is calculated using the various parameters 720 (the information related to the PID control) stored in the storage unit 700. Since the moving object 800 is moving, the autonomous flying device 1 tracks the moving object 800 at the flight velocity obtained by adding the velocity component of the moving object 800 (the moving object velocity component) and the calculated distance adjusting velocity component. Thus, every time the process indicated in FIG. 4 is performed, the distance b approaches zero and the moving object distance becomes equal to the target photographing distance a.

Although a case where the moving object distance in the current state is longer than the target photographing distance is described with reference to FIG. 6, when the moving object distance in the current state is shorter than the target photographing distance, the autonomous flying device 1 tracks the moving object 800 while moving away from the moving object 800 at the flight velocity obtained by subtracting the distance adjusting velocity component from the moving object velocity component.

The movement velocity of the moving object 800 is not always constant but may change. In this case, when for example, the movement velocity of the moving object 800 is changed from the movement velocity (first movement velocity) in the current state to velocity higher than the first movement velocity (second movement velocity), the separation distance controller 650 performs control for increasing the separation distance between the autonomous flying device 1 and the moving object 800. When the movement velocity of the moving object is changed from the first movement velocity, which is 1 m/s for example, to the second movement velocity, which is 2 m/s for example, the distance adjusting velocity calculator 651 determines the target photographing distance as 4 m from 2 m for example. It is assumed that the photographing magnification at the time is fixed to 2×. After that, the separation distance controller 650 performs control for increasing the separation distance by decreasing the flight velocity so as to increase the separation distance to 4 m.

Further, when for example, the movement velocity of the moving object 800 is changed from the movement velocity (the first movement velocity) in the current state to velocity lower than the first movement velocity (the second movement velocity), the separation distance controller 650 performs control for decreasing the separation distance between the autonomous flying device 1 and the moving object 800. When the movement velocity of the moving object is changed from the first movement velocity, which is 2 m/s for example, to the second movement velocity, which is 1 m/s for example, the distance adjusting velocity calculator 651 determines the target photographing distance as 2 m from 4 m for example. It is assumed that the photographing magnification at the time is fixed to 2×. After that, the separation distance controller 650 performs control for decreasing the separation distance by increasing the flight velocity so as to decrease the separation distance to 2 m.

In this manner, the separation distance controller 650 performs control for increasing the separation distance as the movement velocity of the moving object 800 increases.

The flight velocity in a case where the autonomous flying device 1 tracks the moving object from diagonally behind the moving object, that is, where the target horizontal angle θ is not 0 degrees, is described below using FIGS. 7 to 9.

Figure 7:
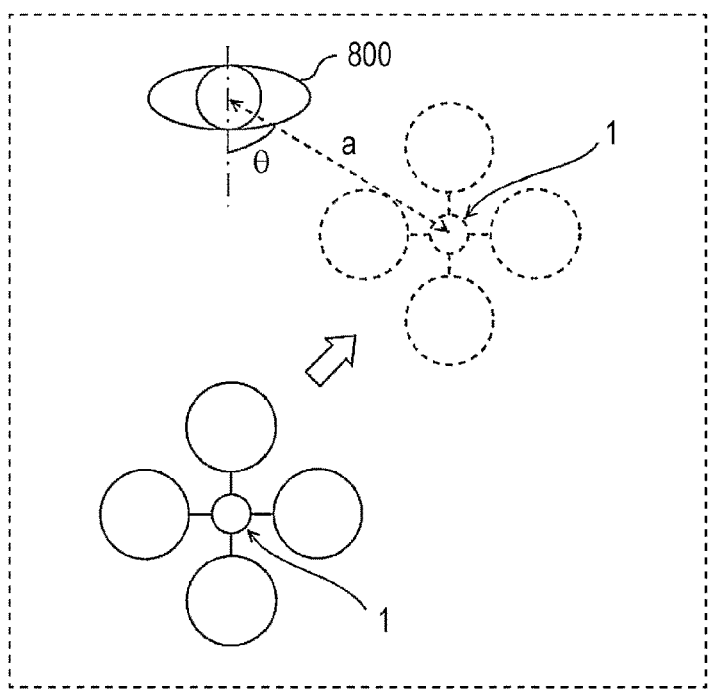
FIG. 7 is a diagram for describing a target horizontal angle.

FIG. 7 is a diagram for describing the target horizontal angle θ.

In FIG. 6, since the autonomous flying device 1 tracks the moving object 800 from directly behind the moving object 800, the separation distance is caused to be the target photographing distance simply by adding the distance adjusting velocity component to or subtracting the distance adjusting velocity component from the movement velocity of the moving object 800. However, there is a demand for obtaining a more impactful image taken by photographing the moving object 800 from the diagonally rear side. The image taken by photographing the moving object 800 from the diagonally rear side is an image taken from the location of the autonomous flying device 1 at the angle θ with respect to the direction opposite the traveling direction of the moving object, which is for example, the location of the autonomous flying device 1 indicated by the dashed lined in FIG. 7. The distance a is the target photographing distance that is determined, depending on the movement velocity of the moving object 800.

When the location of the autonomous flying device 1 indicated by the solid lines in FIG. 7 is assumed to be the current location of the autonomous flying device 1, the separation distance controller 650 needs to perform control for causing the separation distance to be the target photographing distance a and control for causing the target horizontal angle to be the angle θ. Specifically, the θ adjusting velocity calculator 652 calculates the θ adjusting velocity component for the adjustment for positioning the autonomous flying device 1 at the location that forms the target horizontal angle θ with respect to the rear of the moving object. The operation that the θ adjusting velocity calculator 652 performs so as to calculate the θ adjusting velocity component is described using FIG. 8.

Figure 8:
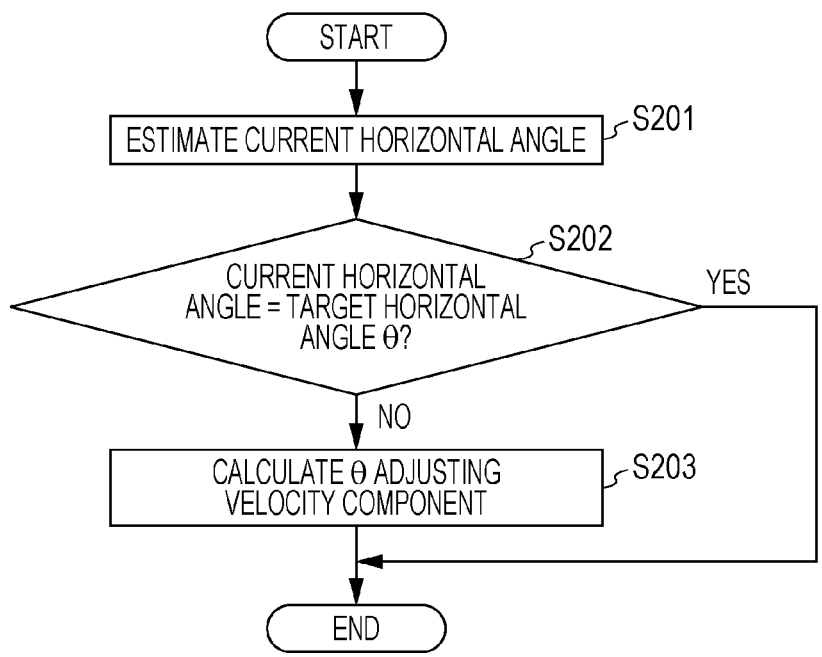
FIG. 8 is a flow chart that illustrates an example of operation that a θ adjusting velocity calculator according to the first embodiment performs so as to calculate a θ adjusting velocity component.

FIG. 8 is a flow chart that illustrates an example of the operation that the θ adjusting velocity calculator 652 according to the first embodiment performs so as to calculate the θ adjusting velocity component.

First, the θ adjusting velocity calculator 652 estimates a current horizontal angle (step S201). Specifically, the θ adjusting velocity calculator 652 estimates the current horizontal angle from the relative location between the autonomous flying device 1 and the moving object 800, which is estimated by the location estimator 620.

After that, the θ adjusting velocity calculator 652 determines whether or not the current horizontal angle and the target horizontal angle θ are equal to each other (step S202). The target horizontal angle θ is information included in the photographing condition information 710 stored in the storage unit 700 and is set by for example, a user (the moving object 800) to be stored in the storage unit 700.

When the θ adjusting velocity calculator 652 determines that the current horizontal angle and the target horizontal angle θ are equal to each other (YES in step S202), the operation that the θ adjusting velocity calculator 652 performs so as to calculate the θ adjusting velocity component ends.

When the distance adjusting velocity calculator 651 determines that the current horizontal angle and the target horizontal angle θ are unequal (NO in step S202), the θ adjusting velocity calculator 652 calculates the θ adjusting velocity component (step S203). The method by which the θ adjusting velocity calculator 652 calculates the θ adjusting velocity component is described using FIG. 9.

Figure 9:
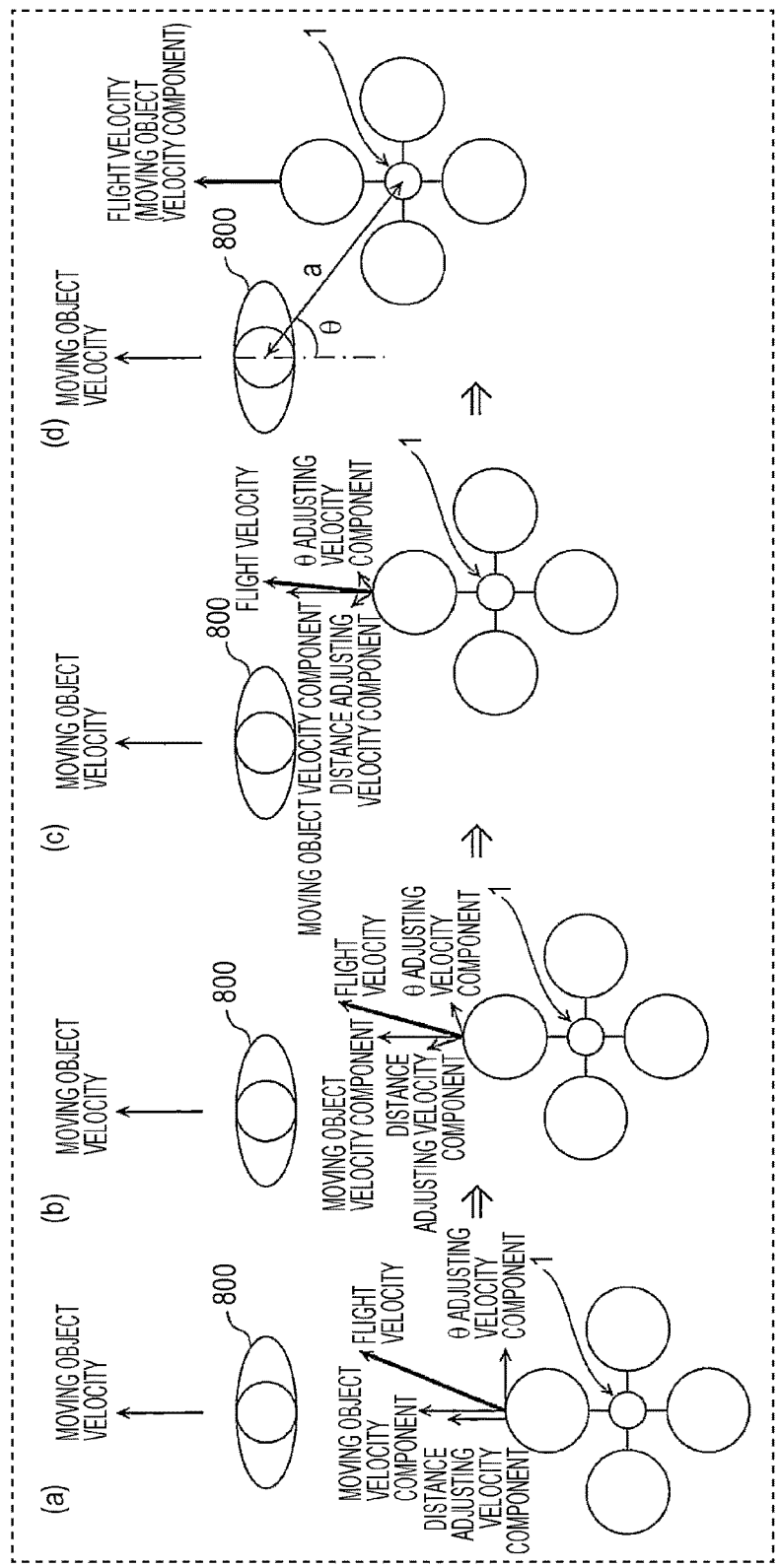
FIG. 9 illustrates diagrams for describing the flight velocity in adjusting the target horizontal angle of the autonomous flying device according to the first embodiment.

FIG. 9 illustrates diagrams for describing the flight velocity in adjusting the target horizontal angle θ of the autonomous flying device 1 according to the first embodiment.

It is assumed that the locational relation between the autonomous flying device 1 and the moving object 800 indicated in FIG. 9(a) and the locational relation between the autonomous flying device 1 and the moving object 800 indicated by the solid lines in FIG. 7 are the same as each other. Further, it is assumed that the locational relation between the autonomous flying device 1 and the moving object 800 indicated in FIG. 9(d) and the locational relation between the autonomous flying device 1 and the moving object 800 indicated by the dashed lines in FIG. 7 are the same as each other. FIG. 9 illustrates how the autonomous flying device 1 moves by the angle θ with respect to the rear of the moving object 800 to the location apart from the moving object 800 by the target photographing distance a.

When the target horizontal angle θ is not adjusted, the flight velocity of the autonomous flying device 1 is the sum of the moving object velocity component and the distance adjusting velocity component as illustrated in FIG. 6, and when the target horizontal angle θ is adjusted, the flight velocity of the autonomous flying device 1 is the sum of the moving object velocity component, the distance adjusting velocity component, and the θ adjusting velocity component. For example, the process illustrated in FIG. 8 is performed at predetermined times and the θ adjusting velocity calculator 652 calculates angle deviation between the current horizontal angle and the target horizontal angle θ at the predetermined times. After that, in accordance with the angle deviation, the θ adjusting velocity calculator 652 calculates the θ adjusting velocity component by control techniques, such as the PID control. In the present embodiment, the θ adjusting velocity component is calculated using the various parameters 720 (the information related to the PID control) stored in the storage unit 700.

As illustrated in FIG. 9, for example, the θ adjusting velocity component is a component in the normal direction of the distance adjusting velocity component. It is demonstrated that the flight velocity of the autonomous flying device 1 changes, depending on the distance adjusting velocity component for causing the separation distance to be the target photographing distance a and the θ adjusting velocity component for causing the current horizontal angle to be the target horizontal angle θ. After that, the autonomous flying device 1 moves by the angle θ with respect to the rear of the moving object 800 to the location apart from the moving object 800 by the target photographing distance a. As illustrated in FIG. 9(d), when the autonomous flying device 1 reaches the target location, the component included in the flight velocity is only the moving object velocity component and the autonomous flying device 1 tracks the moving object 800 at the angle θ with respect to the rear of the moving object 800 from the location apart from the moving object 800 by the target photographing distance a.

In this manner, the autonomous flying device 1 can track the moving object 800 from the diagonally rear side and photograph the moving object 800.

<Operation of Obstacle Avoidance Altitude Calculator>

When the autonomous flying device 1 tracks the moving object 800, the moving object 800 may pass under an obstacle, which is a tree for example. In this case, the autonomous flying device 1 may collide with the obstacle. Thus, the obstacle avoidance altitude calculator 660 of the autonomous flying device 1 calculates an obstacle avoidance altitude for avoiding the obstacle. The operation that the obstacle avoidance altitude calculator 660 performs so as to calculate the obstacle avoidance altitude is described using FIGS. 10 and 11.

Figure 10:
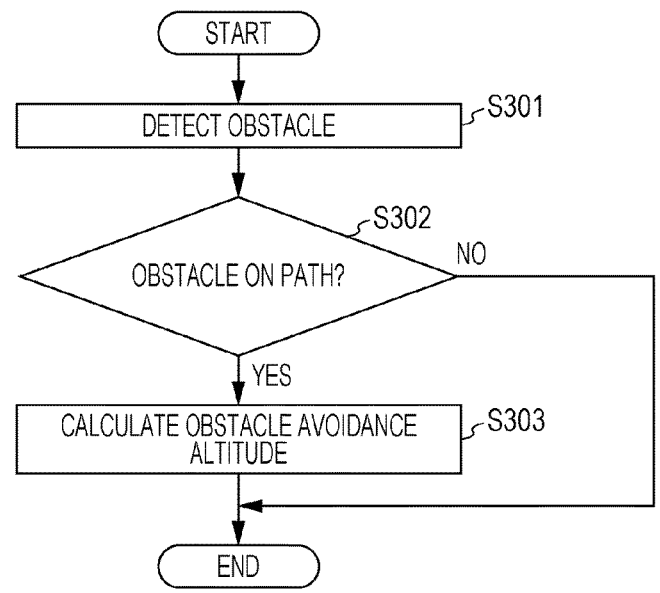
FIG. 10 is a flow chart that illustrates an example of operation that an obstacle avoidance altitude calculator according to the first embodiment performs so as to calculate the obstacle avoidance altitude.

FIG. 10 is a flow chart that illustrates an example of the operation that the obstacle avoidance altitude calculator 660 according to the first embodiment performs so as to calculate the obstacle avoidance altitude.

First, the obstacle detector 640 detects an obstacle (step S301). For example, the obstacle detector 640 detects the elevation and depression angles of the obstacle from the horizontal plane (the XY plane) for the autonomous flying device 1 and the distance from the autonomous flying device 1 to the obstacle.

After that, the obstacle avoidance altitude calculator 660 determines whether or not the obstacle detected by the obstacle detector 640 is present on a flight path, which is based on the current traveling direction (step S302). For example, the obstacle avoidance altitude calculator 660 determines whether or not the obstacle is present, on the flight path, between the current location and the location apart from the current location by a distance necessary to avoid the obstacle at the current flight velocity.

When the obstacle avoidance altitude calculator 660 determines that no obstacle is present on the flight path (NO in step S302), the operation that the obstacle avoidance altitude calculator 660 performs so as to calculate the obstacle avoidance altitude ends.

When the obstacle avoidance altitude calculator 660 determines that an obstacle is present on the flight path (YES in step S302), the obstacle avoidance altitude calculator 660 calculates the obstacle avoidance altitude. Specifically, the obstacle avoidance altitude calculator 660 calculates a range of the flight altitudes with no obstacle in accordance with the elevation and depression angles of the obstacle from the horizontal plane for the autonomous flying device 1, which are detected by the obstacle detector 640. After that, the obstacle avoidance altitude calculator 660 calculates the altitude closest to the current flight altitude as the obstacle avoidance altitude included in the range of the flight altitudes with no obstacle.

When the autonomous flying device 1 avoids an obstacle like a tree under which the moving object 800 passes, it is desirable to cause the obstacle avoidance altitude to be lower than the current flight altitude. When for example, the obstacle avoidance altitude is caused to be higher than the current flight altitude, the autonomous flying device 1 may lose track of the moving object 800. How the autonomous flying device 1 causes the obstacle avoidance altitude to be lower than the current flight altitude is described using FIG. 11.

Figure 11:
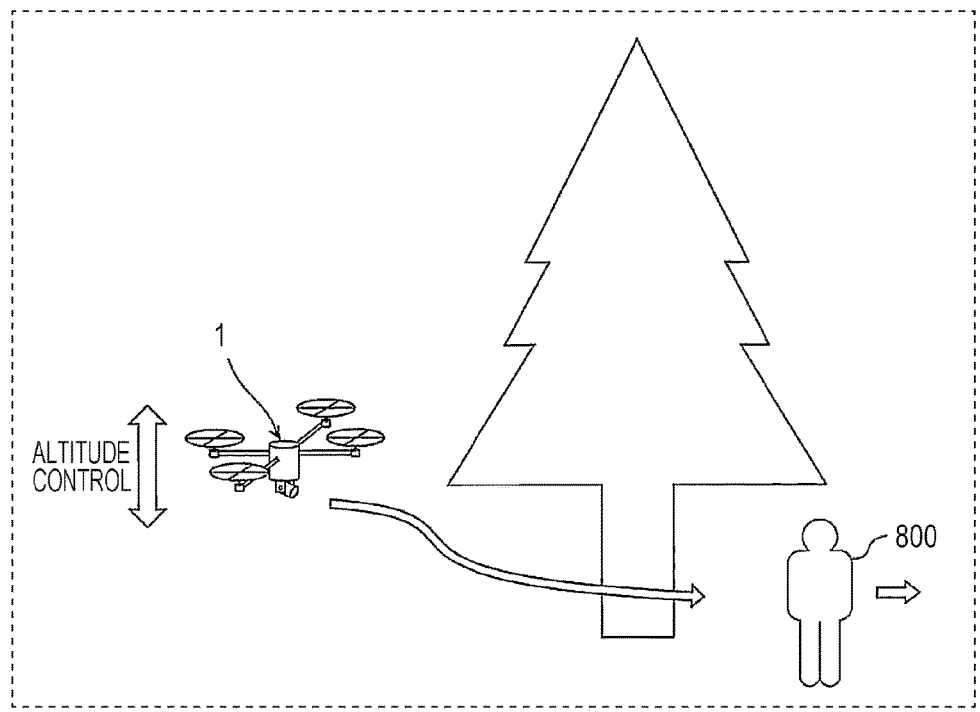
FIG. 11 illustrates how the autonomous flying device according to the first embodiment avoids an obstacle.

FIG. 11 illustrates how the autonomous flying device according to the first embodiment avoids an obstacle.

As illustrated in FIG. 11, similar to the moving object 800 that passes under a tree (an obstacle) by moving through space between the branches and leaves of the tree and the ground, the autonomous flying device 1 attempts to pass under the tree by lowering its own flight altitude. When for example, the autonomous flying device 1 avoids the tree (the obstacle) by raising its own altitude and passing over the branches and leaves of the tree, the moving object 800 may disappear from the photographing range of the photographing unit 300, depending on the height of the tree. It is thus desirable that the obstacle avoidance altitude of the autonomous flying device 1 be lower than the current flight altitude.

<Separation Distance>

The separation distance between the moving object 800 and the autonomous flying device 1 may be a straight-line distance or a horizontal distance between the moving object 800 and the autonomous flying device 1.

Figure 12:
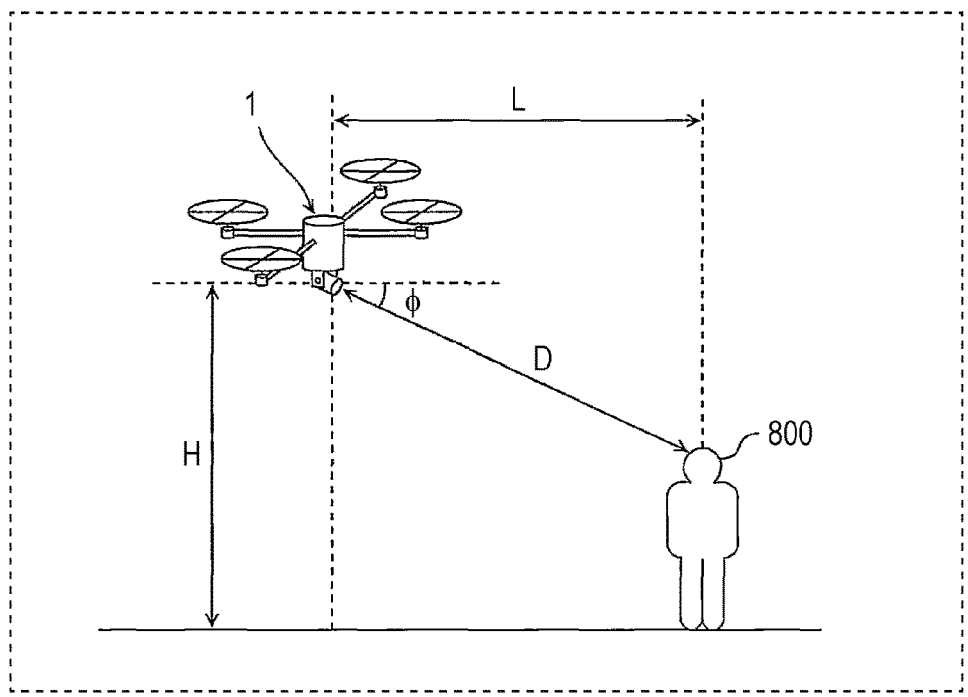
FIG. 12 is a diagram for describing a straight-line distance and a horizontal distance between a moving object and the autonomous flying device.

FIG. 12 is a diagram for describing a straight-line distance D and a horizontal distance L between the moving object 800 and the autonomous flying device 1.

When the separation distance between the moving object 800 and the autonomous flying device 1 is the straight-line distance D, the depression angle $\phi$ from the horizontal plane for the autonomous flying device 1 to the moving object 800 is fixed. Thus, in both cases where the movement velocity of the moving object 800 is high and low, the depression angle $\phi$ from the horizontal plane for the autonomous flying device 1 to the moving object 800 is maintained so as to be constant. Accordingly, the separation distance can be changed while maintaining the viewpoint of the autonomous flying device 1 with respect to the moving object 800.

When the separation distance between the moving object 800 and the autonomous flying device 1 is the horizontal distance L, a flight altitude H of the autonomous flying device 1 is fixed. Thus, in both cases where the movement velocity of the moving object 800 is high and low, the flight altitude H of the autonomous flying device 1 can be maintained so as to be constant.

<Operation of Camera Controller>

It is desirable that the moving object 800 included in an image taken by the photographing unit 300 be positioned centrally on the image since the moving object 800 is the subject to be photographed. The camera controller 670 controls the photographing direction of the photographing unit 300 so that the moving object 800 is positioned centrally on the screen of the photographing unit 300. The operation that the camera controller 670 performs so as to cause the moving object 800 to be seen centrally on the screen of the photographing unit 300 is described using FIG. 13.

Figure 13:
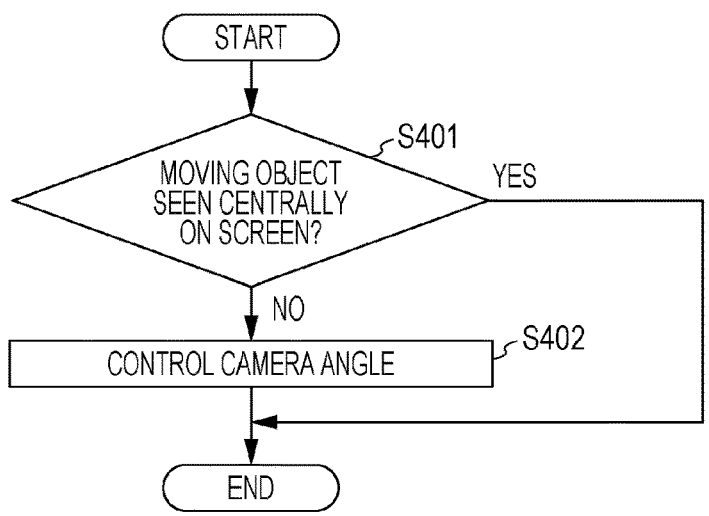
FIG. 13 is a flow chart that illustrates operation of a camera controller according to the first embodiment.

FIG. 13 is a flow chart that illustrates the operation that the camera controller 670 according to the first embodiment performs so as to cause the moving object 800 to be seen centrally on the screen.

First, the target camera angle estimator 610 determines whether or not the moving object 800 is seen centrally on the screen of the photographing unit 300 (step S401). Specifically, the target camera angle estimator 610 detects the location of the moving object 800 on the photographing screen of the photographing unit 300 by for example, image recognition techniques and determines whether or not the moving object 800 is present centrally on the photographing screen.

When the target camera angle estimator 610 determines that the moving object 800 is seen centrally on the screen of the photographing unit 300 (YES in step S401), the operation that the camera controller 670 performs so as to cause the moving object 800 to be seen centrally on the screen ends.

When the target camera angle estimator 610 determines that the moving object 800 is not seen centrally on the screen of the photographing unit 300 (NO in step S401), the camera controller 670 controls the camera angle, which is the photographing direction of the photographing unit 300 (step S402). First in step S401, in accordance with the output of the photographing unit 300, the target camera angle estimator 610 estimates the depression angle $\alpha$ and the horizontal rotation angle $\beta$ at which the moving object 800 is seen centrally on the screen of the photographing unit 300. Then in step S402, the camera controller 670 controls the photographing direction of the photographing unit 300 using the depression angle $\alpha$ and the horizontal rotation angle $\beta$ estimated by the target camera angle estimator 610. Thus, the camera controller 670 enables the moving object 800 to be photographed centrally on the screen of the photographing unit 300.

<Advantages Etc.>

As described above, the autonomous flying device 1 according to the present embodiment performs control for increasing the separation distance as the movement velocity of the moving object 800 increases. Advantages brought by the autonomous flying device 1 are described using FIGS. 14A and 14B.

Figure 14A:
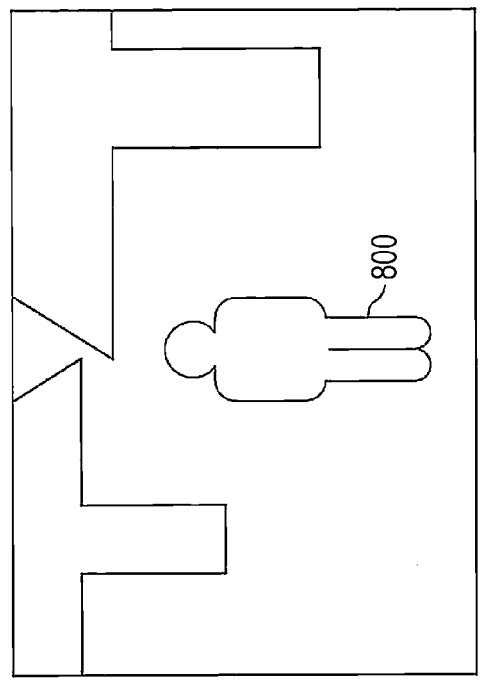
FIGS. 14A and 14B are diagrams for describing advantages of the autonomous flying device according to the first embodiment.
Figure 14B:
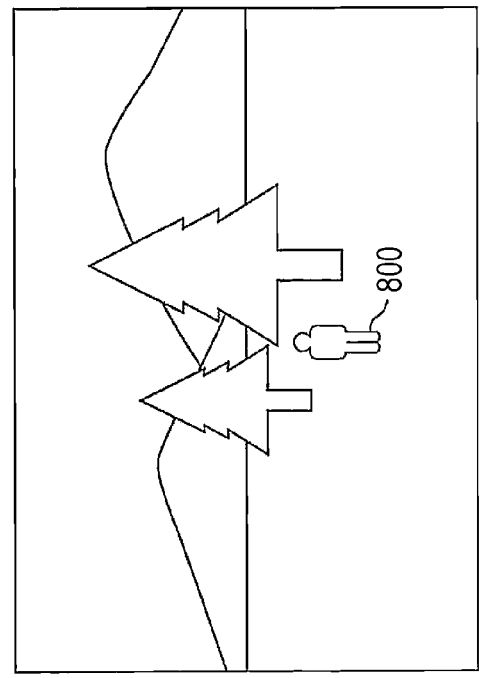

FIGS. 14A and 14B are diagrams for describing the advantages of the autonomous flying device 1 according to the first embodiment. FIG. 14A is a diagram that illustrates an image taken by the photographing unit 300 when the movement velocity of the moving object 800 is high. FIG. 14B is a diagram that illustrates an image taken by the photographing unit 300 when the movement velocity of the moving object 800 is low.

When the movement velocity of the moving object 800 is high, blurring of the moving object 800 on the taken image may occur or the moving object 800 may disappear from the taken image. As a result, as illustrated in FIG. 14A, as the separation distance between the moving object 800 and the autonomous flying device 1 increases, the angle of view becomes wider. Thus, when the movement velocity of the moving object 800 is high, occurrence of blurring or disappearance of the moving object 800 on an image where the moving object 800 is photographed can be inhibited.

When the movement velocity of the moving object 800 is low, blurring of the moving object on the taken image or disappearance of the moving object from the taken image is less likely to occur. As a result, as illustrated in FIG. 14A, the separation distance between the moving object 800 and the autonomous flying device 1 decreases and accordingly, the angle of view becomes narrower. Thus, when the movement velocity of the moving object 800 is low, it can be inhibited that the moving object 800 appears small on the taken image.

Second Embodiment

Figure 15:
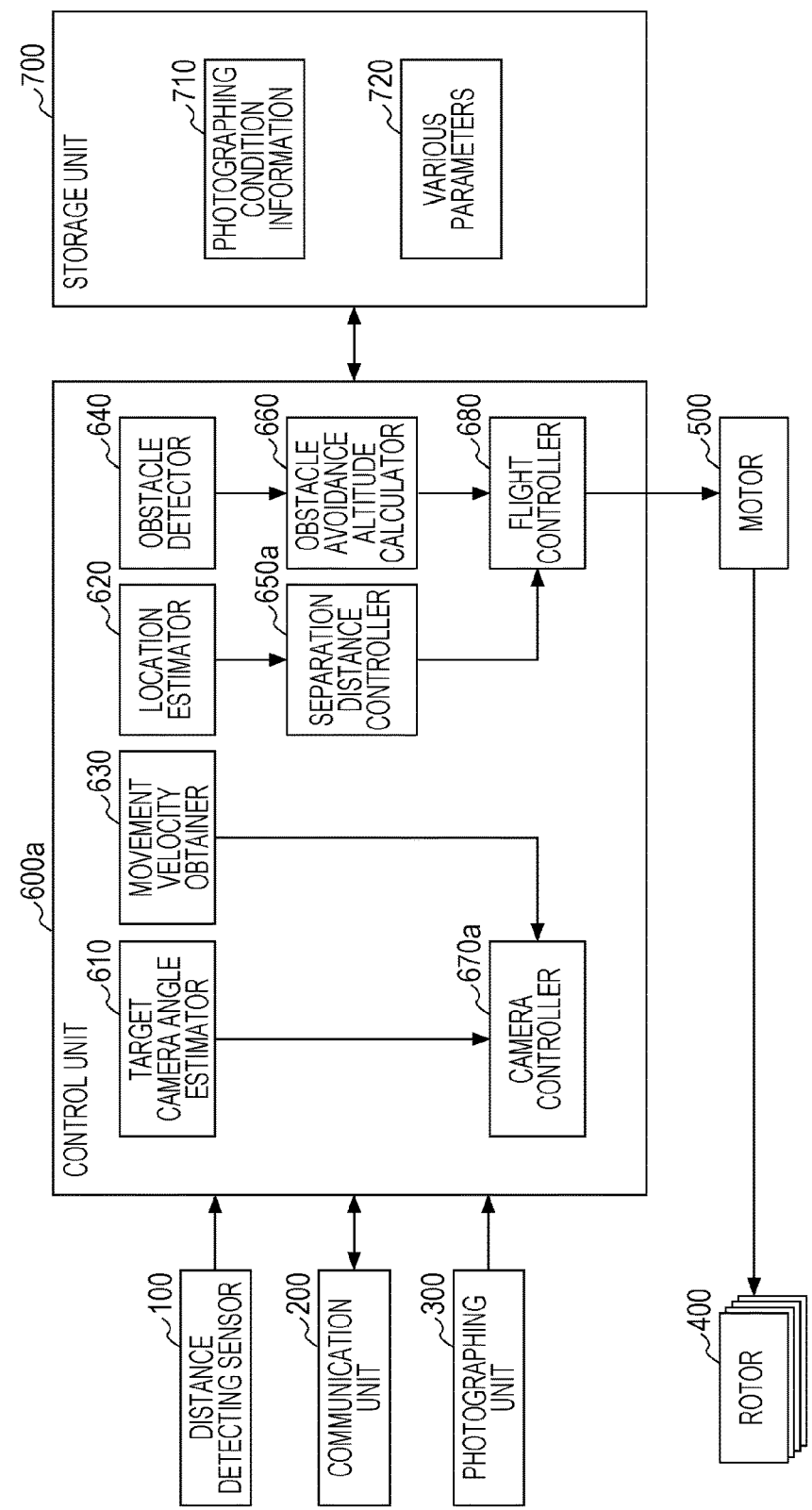
FIG. 15 is a block diagram that illustrates an example of a structure of an autonomous flying device according to the second embodiment.

A second embodiment is described using FIGS. 15 to 17.

FIG. 15 is a block diagram that illustrates an example of a structure of an autonomous flying device 1a according to the second embodiment.

The autonomous flying device 1a according to the present embodiment is different from the autonomous flying device 1 according to the first embodiment in that the autonomous flying device 1a includes a control unit 600a instead of the control unit 600. The other points are the same as in the first embodiment and descriptions thereof are omitted. In addition, the control unit 600a is different from the control unit 600 in that the control unit 600a includes a separation distance controller 650a and a camera controller 670a instead of the separation distance controller 650 and the camera controller 670, the other points are the same and descriptions thereof are omitted. The autonomous flying device 1a tracks a moving object 800 and flies while keeping a predetermined separation distance (the photographing distance) with respect to the moving object 800. The predetermined separation distance is set by for example, a user and information that indicates the predetermined separation distance is stored in a storage unit 700.

The separation distance controller 650a controls the separation distance and the locational relation between the autonomous flying device 1a and the moving object 800 estimated by a location estimator 620. The separation distance controller 650a calculates the flight velocity of the autonomous flying device 1a so as to control the separation distance and the locational relation between the autonomous flying device 1a and the moving object 800. While the separation distance controller 650 according to the first embodiment controls the separation distance in accordance with the information that is obtained by a movement velocity obtainer 630 and indicates the movement velocity of the moving object 800, for example, the separation distance controller 650a according to the present embodiment controls the separation distance in accordance with the information that is stored in the storage unit 700 and indicates the predetermined separation distance. Further, the separation distance controller 650a causes a flight controller 680 to control the flight velocity so that the separation distance from the location of the moving object 800 estimated by the location estimator 620 becomes the photographing distance set by a user for example.

The camera controller 670a (a magnification controller) controls the photographing magnification of a photographing unit 300 in accordance with the information that is obtained by the movement velocity obtainer 630 and indicates the movement velocity of the moving object 800. The camera controller 670a can also perform the operation of the camera controller 670 according to the first embodiment. The camera controller 670a is described below using FIG. 16.

FIG. 16 is a flow chart that illustrates an example of the operation that the camera controller 670a according to the second embodiment performs so as to control the photographing magnification of the photographing unit 300.

First, the movement velocity obtainer 630 obtains information that indicates the movement velocity of the moving object 800 (step S501).

After that, the camera controller 670a determines a target photographing magnification (step S502). Specifically, the camera controller 670a determines the target photographing distance (the separation distance) in accordance with the information that is obtained by the movement velocity obtainer 630 and indicates the movement velocity, and on photographing condition information 710 (corresponding relation between the movement velocity of the moving object 800 and the photographing magnification) stored in the storage unit 700. An example of the photographing condition information 710 is described using FIG. 17.

FIG. 17 is a chart that illustrates an example of the photographing condition information 710 stored in the storage unit 700 according to the second embodiment.

As illustrated in FIG. 17, in the present embodiment, the photographing condition information 710 includes information that indicates the predetermined corresponding relation between the movement velocity of the moving object 800 and a target photographing magnification, which is the optimum photographing magnification for the movement velocity of the moving object 800. FIG. 17 indicates the corresponding relation between the movement velocity of the moving object and the target photographing magnification in a case where each photographing distance of the photographing unit 300 (each separation distance between the moving object 800 and the autonomous flying device 1a) is fixed to a predetermined photographing distance. The photographing distance between the moving object 800 and the autonomous flying device 1a is set by a user for example, as described above, and the information that indicates the set photographing distance is stored in the storage unit 700. As illustrated in FIG. 17, regardless of the length of the photographing distance, the target photographing magnification decreases as the velocity of the moving object 800 increases.

When for example, the velocity of the moving object is 2 m/s while the photographing distance is set to 2 m, the camera controller 670a determines the target photographing magnification as 1×. When for another example, the velocity of the moving object is 10 m/s while the photographing distance is set to 2 m, the camera controller 670a determines the target photographing magnification as 0.2×. Thus, the camera controller 670a (the magnification controller) performs control for decreasing the photographing magnification as the movement velocity of the moving object 800 increases.

After that, the camera controller 670a performs control for causing the photographing magnification of the photographing unit 300 to be the determined target photographing magnification (step S503).

As described above, the autonomous flying device 1a according to the present embodiment performs control for decreasing the photographing magnification as the movement velocity of the moving object 800 increases.

Similar to the advantages brought by the autonomous flying device 1, as the photographing magnification of the autonomous flying device 1a for the moving object 800 decreases, the angle of view becomes wider. Accordingly, when the movement velocity of the moving object 800 is high, occurrence of blurring or disappearance of the moving object 800 on an image where the moving object 800 is photographed can be inhibited. As the photographing magnification of the autonomous flying device 1a for the moving object 800 increases, the angle of view becomes narrower. Thus, when the movement velocity of the moving object 800 is low, it can be inhibited that the moving object 800 appears small on a taken image.

Other Embodiments

Although the autonomous flying device and the control method of the autonomous flying device according to the present disclosure are described above on the basis of the embodiments, the present disclosure is not limited to these embodiments. What is obtained by adding various changes that a person skilled in the art can conceive to the present embodiments and other embodiments formed by combining constituents and functions in different embodiments are also included in the scope of the present disclosure as long as the resultant will not deviate from the gist of the present disclosure.

Although for example, in the above-described embodiment, the separation distance controller 650 performs control for changing the target photographing distance (the separation distance), depending on the change in the movement velocity of the moving object 800 as illustrated in FIG. 5, the present disclosure is not limited thereto. For example, the separation distance controller 650 may determine whether or not the movement velocity of the moving object 800 is higher than a predetermined threshold value. When the movement velocity of the moving object 800 is higher than the predetermined threshold value, the separation distance controller 650 may perform control for causing the separation distance to be a first separation distance and when the movement velocity of the moving object 800 is lower than the predetermined threshold value, the separation distance controller 650 may perform control for causing the separation distance to be a second separation distance shorter than the first separation distance.

Thus, when the movement velocity of the moving object 800 is higher than the predetermined threshold value, the photographing unit 300 enters a photographing mode in which an image with a wide angle of view is taken, and when the movement velocity of the moving object 800 is lower than the predetermined threshold value, the photographing unit 300 enters a photographing mode in which an image with a narrow angle of view is taken. That is, the photographing mode in which an image with a wide angle of view is taken and the photographing mode in which an image with a narrow angle of view is taken can be switched, depending on the movement velocity of the moving object 800, by setting one threshold value. For another example, a plurality of modes may be switched, depending on the movement velocity of the moving object 800, by setting a plurality of threshold values.

Although in the above-described embodiment, for example, the camera controller 670a performs control for changing the target photographing magnification, depending on the change in the movement velocity of the moving object 800 as illustrated in FIG. 17, the present disclosure is not limited thereto. For example, the camera controller 670a may determine whether or not the movement velocity of the moving object 800 is higher than a predetermined threshold value. When the movement velocity of the moving object 800 is higher than the predetermined threshold value, the camera controller 670a may perform control for causing the photographing magnification to be first magnification and when the movement velocity of the moving object 800 is lower than the predetermined threshold value, the camera controller 670a may perform control for causing the photographing magnification to be second magnification higher than the first magnification.

Thus, when the movement velocity of the moving object 800 is higher than the predetermined threshold value, the photographing unit 300 enters the photographing mode in which an image with a wide angle of view is taken and when the movement velocity of the moving object 800 is lower than the predetermined threshold value, the photographing unit 300 enters the photographing mode in which an image with a narrow angle of view is taken. That is, the photographing mode in which an image wide in angle of view is taken and the photographing mode in which an image narrow in angle of view is taken can be switched, depending on the movement velocity of the moving object 800, by setting one threshold value. For another example, a plurality of modes may be switched, depending on the movement velocity of the moving object 800, by setting a plurality of threshold values.

Although for example, in the above-described embodiments, the control of the separation distance dependent on the movement velocity of the moving object 800 or the control of the photographing magnification dependent on the movement velocity of the moving object 800 is performed, both of the controls may be performed. For example, when in the first embodiment, the separation distance is too long while the movement velocity of the moving object 800 is high, the photographing magnification may also be controlled. Similarly, when in the first embodiment, the separation distance is too short while the movement velocity of the moving object 800 is low, the photographing magnification may also be controlled. When for example, it is desired in the second embodiment to change the angle of view to an extent beyond the photographing magnification that the photographing unit 300 can change, the separation distance may also be controlled. In this case, a user may give the higher priority to one of the separation distance and the photographing magnification in performing the controls.

General or specific embodiments may be implemented as a system, a method, an integrated circuit, a computer program, or a computer-readable recording medium, such as a compact disc read-only memory (CD-ROM), or may be implemented as any selective combination thereof. For example, the present disclosure may be implemented as a program for causing a computer of an autonomous flying device to execute a control method of the autonomous flying device. The present disclosure may also be implemented as information, data, or a signal, which indicates the program. The program, information, data, and signal may be delivered via a communication network, such as the Internet.

In addition, the present disclosure includes other embodiments obtained by adding various changes that a person skilled in the art can conceive to the above-described embodiments and other embodiments implemented by combining constituents and functions in each embodiment within the scope not deviating from the gist of the present disclosure.

The present disclosure provides an autonomous flying device, a control method of the autonomous flying device, and a non-transitory recording medium, and is useful for equipment, toys, and the like to photograph moving objects from the air since the present disclosure enables a moving object to be photographed through automatic tracking after the moving object and can suitably inhibit the occurrence of blurring or disappearance of the moving object on a taken image.

What is claimed is:

1. An autonomous flying device that tracks a moving object and flies, the autonomous flying device comprising:
    a sensor that obtains first information related to a velocity of the moving object;
    a controller that controls flight of the autonomous flying device; and
    a driver that drives the autonomous flying device, wherein
    the controller further sets a velocity of the autonomous flying device in accordance with the first information, such that the velocity of the autonomous flying device causes a distance between the moving object and the autonomous flying device to increase as the velocity of the moving object increases, and
    the driver further causes the autonomous flying device to fly at the velocity set by the controller.

2. The autonomous flying device according to claim 1, wherein
    the distance is a straight-line distance between the moving object and the autonomous flying device.

3. The autonomous flying device according to claim 1, wherein
    the distance is a horizontal distance between the moving object and the autonomous flying device.

4. The autonomous flying device according to claim 1, wherein
    when the velocity of the moving object is higher than a predetermined threshold value,
        the controller sets a first velocity that causes the distance to be a first distance, and
        the driver causes the autonomous flying device to fly at the first velocity, and
    when the velocity of the moving object is lower than the predetermined threshold value,
        the controller sets a second velocity that causes the distance to be a second distance that is shorter than the first distance, and
        the driver causes the autonomous flying device to fly at the second velocity.

5. The autonomous flying device according to claim 1, wherein
    when the first information indicates that the velocity of the moving object changes from a first velocity to a second velocity that is higher than the first velocity,
        the controller sets the velocity of the autonomous flying device to a third velocity that increases the distance, and
        the driver causes the autonomous flying device to fly at the third velocity.

6. The autonomous flying device according to claim 1, wherein
    when the first information indicates that the velocity of the moving object changes from first velocity to second velocity that is lower than the first velocity,
        the controller sets the velocity of the autonomous flying device to a fourth velocity so as to decrease the distance, and
        the driver causes the autonomous flying device to fly at the fourth velocity.

7. The autonomous flying device according to claim 1, further comprising:
    a memory that stores second information indicating a corresponding relation between the velocity of the moving object and a target distance between the moving object and the autonomous flying device, wherein
    when the first information indicates that the velocity of the moving object is a first velocity,
        the controller sets a second velocity in accordance with the second information, wherein the second velocity causes the distance to be a first target distance corresponding to the first velocity, and
        the driver causes the autonomous flying device to fly at the second velocity.

8. The autonomous flying device according to claim 7, wherein
    when the distance is longer than the first target distance corresponding to the first velocity,
        the controller sets the second velocity that is higher than the first velocity, and
        the driver causes the autonomous flying device to fly at the second velocity, and when the distance is shorter than the first distance corresponding to the first velocity,
        the controller sets a third velocity that is lower than the first velocity, and
        the driver causes the autonomous flying device to fly at the third velocity.

9. The autonomous flying device according to claim 1, further comprising:
    a camera that captures an image including the moving object, wherein
    the image is a still image or a moving image.

10. An autonomous flying device that tracks a moving object and flies, the autonomous flying device comprising:
    a camera that captures an image including the moving object;
    a sensor that obtains first information related to a velocity of the moving object;
    a controller that controls flight of the autonomous flying device; and
    a driver that drives the autonomous flying device, wherein
    the controller further sets a photographing magnification of the camera in accordance with the first information such that the photographing magnification decreases as the velocity of the moving object increases, and the camera further captures the image at the photographing magnification set by the controller.

11. The autonomous flying device according to claim 10, wherein when the velocity of the moving object is higher than a predetermined threshold value, the controller sets the photographing magnification to a first magnification, and the camera captures the image at the first magnification, and when the velocity of the moving object is lower than the predetermined threshold value, the controller sets the photographing magnification to a second magnification that is higher than the first magnification, and the camera captures the image at the second magnification.

12. The autonomous flying device according to claim 10, wherein when the first information indicates that the velocity of the moving object changes from a first velocity to a second velocity that is higher than the first velocity, the controller changes the photographing magnification from a first magnification to second magnification that is lower than the first magnification, and the camera switches from the first magnification to the second magnification and captures the image at the second magnification.

13. The autonomous flying device according to claim 10, wherein when the first information indicates that the velocity of the moving object changes from a first velocity to a second velocity that is lower than the first velocity, the controller changes the photographing magnification from a first magnification to a second magnification that is higher than the first magnification, and the camera switches from the first magnification to the second magnification and captures the image at the second magnification.

14. The autonomous flying device according to claim 10, further comprising:

a memory that stores second information indicating a corresponding relation between the velocity of the moving object and target photographing magnification, wherein the controller sets the photographing magnification to a first magnification corresponding to the velocity of the moving object in accordance with the second information, and the camera captures the image at the first magnification.

15. The autonomous flying device according to claim 10, wherein the image captured by the camera is a still image or a moving image.

16. A control method of an autonomous flying device that tracks a moving object and flies, the autonomous flying device including a sensor, a controller, and a driver, the control method comprising:

obtaining, from the sensor, information related to a velocity of the moving object;

setting, by the controller, a velocity of the autonomous flying device in accordance with the information so that the velocity of the autonomous flying device increases as a distance between the moving object and the autonomous flying device increases; and causing, by the driver, the autonomous flying device to fly at the set velocity.

17. A non-transitory recording medium in which a program is recorded, wherein the program causes a computer to execute the control method according to claim 16.

18. A control method of an autonomous flying device that tracks a moving object and flies, the autonomous flying device including a camera, a controller and a sensor, the control method comprising:

obtaining, from the sensor, information related to a velocity of the moving object;

setting, by the controller, photographing magnification of the camera in accordance with the information, such that the photographing magnification decreases as the velocity of the moving object increases; and causing, by the controller, the camera to capture an image including the moving object at the set photographing magnification.

19. A non-transitory recording medium in which a program is recorded, wherein the program causes a computer to execute the control method according to claim 18.

* * * * *